(12) United States Patent
Behrens et al.

(10) Patent No.: US 9,025,274 B1
(45) Date of Patent: May 5, 2015

(54) METHOD AND APPARATUS FOR WRITING TO AND READING FROM MULTIPLE DRIVE HEADS

(71) Applicant: Marvell International Ltd., Hamilton (BM)

(72) Inventors: Richard T. Behrens, Santa Clara, CA (US); Alan Armstrong, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/297,788

(22) Filed: Jun. 6, 2014

Related U.S. Application Data

(60) Provisional application No. 61/836,540, filed on Jun. 18, 2013.

(51) Int. Cl.
*G11B 21/02* (2006.01)
*G11B 5/596* (2006.01)
*G11B 5/48* (2006.01)

(52) U.S. Cl.
CPC ..................... *G11B 5/4813* (2013.01)

(58) Field of Classification Search
CPC .... G11B 5/6005; G11B 5/59633; G11B 5/54; G11B 5/5547; G11B 21/083
USPC ......... 360/75, 63, 77.01, 77.12, 77.05, 78.14, 360/72.2, 73.12, 77.07, 77, 11
See application file for complete search history.

(56) References Cited

U.S. PATENT DOCUMENTS

| | | | | |
|---|---|---|---|---|
| 4,724,495 A * | 2/1988 | Hedberg et al. | ................ | 360/22 |
| 5,262,908 A * | 11/1993 | Iwamatsu et al. | .......... | 360/77.12 |
| 5,555,139 A * | 9/1996 | Jacques | ...................... | 360/77.05 |
| 7,092,200 B2 * | 8/2006 | Kitahara | ..................... | 360/77.12 |
| 2003/0086196 A1 * | 5/2003 | Morris et al. | ................... | 360/75 |

* cited by examiner

*Primary Examiner* — Nabil Hindi

(57) ABSTRACT

A method of writing data using more than one write head to write to more than one storage media platter surface of a storage device, where one actuator in the storage device controls positions of all of the write heads, includes controlling the position of one of the write heads to a selected radial track location, writing simultaneously to storage media of the storage device at the selected radial track location using a plurality of the write heads, and, during the writing at the selected radial track location, reading servo data using respective read heads associated with each respective one of the plurality of write heads and recording the radial position of the respective heads for the selected radial track location. During reading, the recorded head position for the track of the platter surface to be read is determined, and the read head is served to the recorded head position.

22 Claims, 3 Drawing Sheets

METHOD AND APPARATUS FOR WRITING TO AND READING FROM MULTIPLE DRIVE HEADS

CROSS REFERENCE TO RELATED APPLICATION

This claims the benefit of commonly-assigned U.S. Provisional Patent Application No. 61/836,540, filed Jun. 18, 2013, which is hereby incorporated by reference herein in its entirety.

FIELD OF USE

This disclosure relates to data storage systems of the type in which multiple read and write heads move over the surfaces of multiple storage media. More particularly, this disclosure relates to writing with more than one of those heads at a particular time, and to reading data so written.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In magnetic recording, as one example, reading and writing are performed by one or more heads that move relative to the surface of a storage medium. Many magnetic disk drives, for example, include a plurality of individual disks, or "platters," which may be two-sided—i.e., each platter can store data on each of its two sides. Therefore, such a disk drive would have at least two heads for each platter. Indeed, for each platter, there is normally at least one write head and at least one read head, so that such a disk drive normally has at least four heads per platter. Although the read heads and write heads are separate, they may share some structures, and they may be mounted on a common substrate.

In a common configuration, all of the heads in a given disk drive are mounted on arms attached to a common actuator that controls the radial position of the heads (a circumferential component of motion is provided by the rotation of the platters relative to the heads). That means that all of the heads in a disk drive generally move together. While some disk drives include "dual-stage" actuators that provide some degree of independence to the different heads on the common actuator, the degree of independence may be limited.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial position of the head and can feed back that determination to control the position of the read head or the write head, depending on the required operation.

In most read or write operations, if data are to be written to, or read from, different platters in a disk drive, it is unlikely that the data on the different platters will be at the same position on each platter (a collection of positions at a single radius on a single side of a single platter is referred to as a "track" of that side of that platter; a collection of tracks at nominally identical radial positions on all of the sides of all of the platters of a disk drive is referred to as a "cylinder" of the disk drive). Therefore, it is common for the actuator to move all of the heads to a particular cylinder to accommodate reading or writing by just one of the heads of just one track on one side of one platter.

If other operations are queued up to access other tracks, those other operations would wait. Even if there is another operation that will access a different track in the same cylinder (i.e., the same cylinder but a different platter), because there is only one actuator controlling all heads, and because the radial position of each head may vary slightly (e.g., because of environmental conditions such as vibration, or thermal gradients that distort the actuator and/or arms), normally that other operation still has to wait because the servo operation can only move the actuator to one position at a time (unless there are dual-stage actuators as noted above, and the difference in position from platter to platter is within the range of independent motion provided by the dual-stage actuators).

SUMMARY

According to this disclosure, a method of writing data using more than one write head to write to more than one storage media platter surface of a storage device at a time, where one actuator in the storage device controls positions of all of the more than one write head, includes controlling the position of one of the write heads to a selected radial track location, writing simultaneously to storage media of the storage device at the selected radial track location using a plurality of write heads of the more than one write head, and, during the writing at the selected radial track location, reading servo data using respective read heads associated with each respective one of the plurality of write heads of the more than one write head and recording the radial position of the respective heads for the selected radial track location.

According to some implementations of the foregoing method, the recording of the radial position of the respective heads for the selected radial track location includes recording an average radial position for the selected radial track location over all servo wedges.

According to some implementations of the foregoing method, the recording of the radial position of the respective heads for the selected radial track location includes recording a radial position for each servo wedge of the selected radial track location.

According to some implementations of the foregoing method, the recording of the radial position of the respective heads for the selected radial track location includes recording read head position. According to other implementations of the foregoing method, the recording of the radial position of the respective heads for the selected radial track location includes converting read head position to write head position, and recording the write head position.

According to some implementations of the foregoing method, the plurality of write heads of the more than one write head includes all write heads of the more than one write head, and the method further includes, after the writing at the selected radial track location, controlling the position of the one of the write heads to another radial track location adjacent the selected radial track location, writing simultaneously to the storage media at the other radial track location using all of the more than one write head, and during the writing at the other radial track location, reading servo data using respective read heads associated with each respective one of the more than one write head and recording radial position of the respective heads for that other radial track location. In a disk drive having a plurality of storage media platters, of which more than one storage media platter surface is written at a time using a plurality of write heads only one of which has a controlled position during writing but where positions of heads for other platter surfaces are recorded during writing, a method of reading data according to some implementations of this disclosure includes selecting a track of a platter surface to be read, determining the recorded head position for the track of the platter surface to be read, and servoing the read head for the track of the platter surface to be read to the recorded head position.

According to some implementations of this disclosure, a controller for a disk drive having a plurality of read heads and a plurality of write heads, when for writing to the disk drive, servoes the position of one of the write heads to a selected radial track location, writes simultaneously to storage media of the storage device at the selected radial track location using a plurality of the write heads, and during writing at the selected radial track location, reads servo data using respective read heads associated with each respective one of the write heads and records the radial position of each of the respective heads for the selected radial track location.

According to some implementations of this disclosure, the disk drive controller, when reading from the disk drive, selects a track of a platter surface to be read, determines the recorded head position for the track of the platter surface to be read, and servoes the read head for the track of the platter surface to be read to the determined recorded head position. The recorded head position may be write head position.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
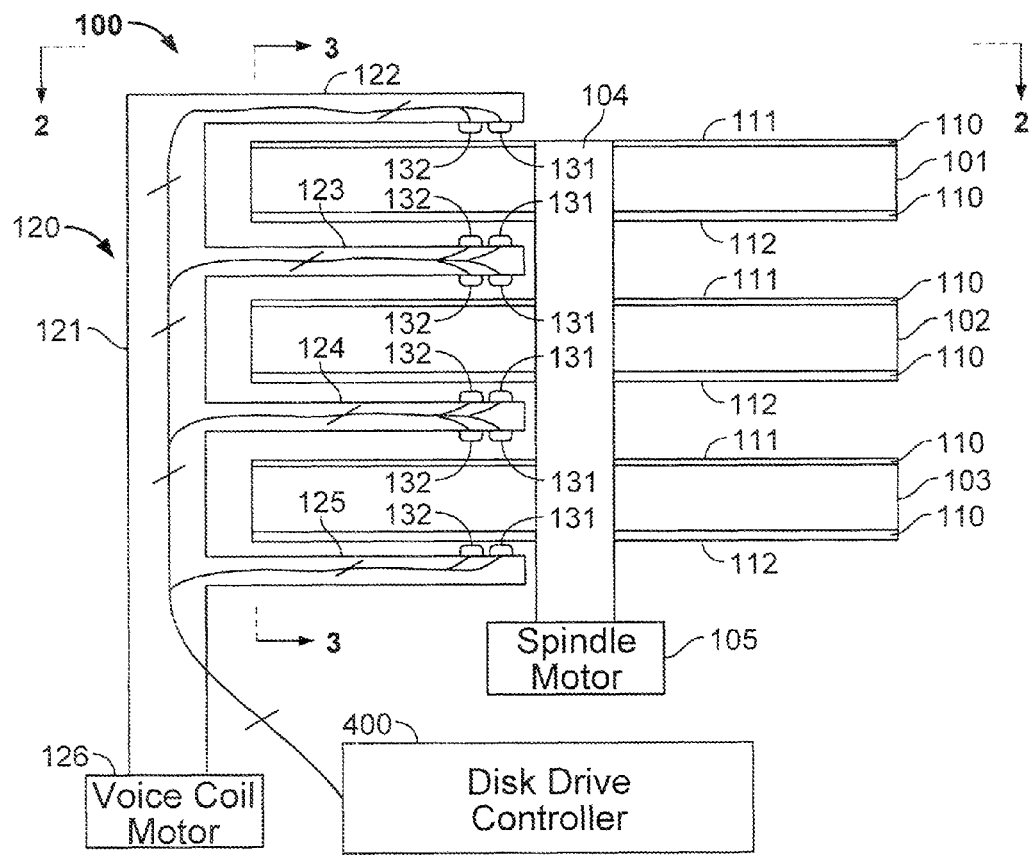
FIG. 1 is a side elevational view of a portion of a disk drive with which the present disclosure may be used.

For some operations, it would be desirable to use more than one head—even all heads—at one time. For example, if a failed drive needs to be reconstructed, or a drive is simply being copied or initially loaded with data, it would be desirable to be able to use all heads at once. Even for "ordinary" writing, in high-performance situations it may be desirable to access two or more tracks within the same cylinder at the same time. However, because of the inability to servo more than one head at a time, only one platter can be read or written at a time. This is particularly an issue for writing because writing a track in the wrong radial position will, have consequences during future reading operations.

This disclosure relates to a method and apparatus for writing using more than one head at a time. As noted above, the limitation on accessing multiple heads for writing is based on the inability to more the heads independently, and not on any inherent characteristic that prevents more than one head from operating at a time. Thus, all of the read and write heads of a disk drive may be capable of operating at the same time when connected to a controller and write channel with that capability.

In accordance with this disclosure, write operations are carried out using more than one, and up to all, of the write heads of a disk drive at the same time. The write operations will nominally be directed to different tracks within one cylinder of the disk drive—i.e., to different tracks at the same radial position on different surfaces of the various platters. As noted above, the position of only one of the write heads can be precisely controlled, and therefore only one head—e.g., the head for the top surface of the top platter—will be so controlled. Nevertheless, more than one, and up to all, of the write heads will be used to write to their respective tracks in the corresponding cylinder.

Reading and writing may be time-multiplexed so that true simultaneous operation is not possible. And writing is suspended over servo wedges so that they can be read and not overwritten. Nevertheless, as noted above, although only the position of one head can be controlled, all the read heads and write heads are operational much of the time. Therefore, even though the position of the other heads cannot be controlled, the positions of all heads can be read from the servo wedge data on the respective platter surfaces. Thus, for at least each write head other than the write head whose position is controlled, the corresponding read head will be used to read servo data to derive a position error signal (PES) that indicates the position of that write head during the writing operation. The PES will actually reflect the position of the read head that reads the servo data, but there would be a relationship between read head position and write head position that can be known once calibrated during drive manufacture. That PES can be recorded, either with or without a correction for the relationship between read head position and write head position, and consulted when it is desired to read one of those tracks.

For example, if a particular write head is displaced inward (i.e., toward the center of the disk) by one-half of a track width from the head that is controlled, then when it is desired to read the track written by that particular write head, the recorded PES for that track can be read, and the head actuator can be instructed to move to a position one-half of a track width inward from the nominal position of that track. It will be apparent that only one track can be read at a time in this way, unless two of the heads happen to have sufficiently similar position offsets, or offsets that are sufficiently close to an integer number of tracks.

It should be noted that if the read head and the write head for any given platter surface are at the same radial position, then no correction of the position as read during writing is required. The position of the read head that is recorded will be the same as position of the write head and will be the position to which the read head should be servoed during reading. However, because the actuator moves the arms that bear the heads in an arcuate motion as described below, there can only be at most one track for which the read head will be at the same radial position as the write head. Therefore, it may make more sense to convert to the write head position in each case, and then, during reading, to servo the read head to the recorded write head position. However, both positions are used; therefore, either one may be stored, and a conversion can be applied if the other one is needed. An exception may be shingled magnetic recording, where random access overwriting is restricted, so in that case storing the write head position may make the most sense.

The relative positions of the various heads connected to a single actuator—i.e., all heads in the "head stack"—may not be constant. If they were, then controlling the position of one head would be the same as controlling the positions of all heads. Therefore, in order to minimize changes in the relative head positions, when writing according to embodiments of this disclosure, as steady a state as possible should be achieved. For example, after each seek operation, it may be desirable to wait longer than one otherwise would wait to begin writing, to allow additional time for vibrations induced by the seek operation to settle out, because misalignment resulting from seek-induced vibration may cause more encroachment on neighboring tracks than can be tolerated by available correction techniques.

Physical changes to the drive structure and control circuitry to accommodate techniques according to this disclosure are minimal. For example, because multiple read heads will be used simultaneously (to read the servo data for each track that is being written simultaneously), the number of instances of the read channel circuitry and servo demodulation circuitry, or at least those portions of the read channel circuitry used to read the servo wedges, would have to be at least equal to the maximum number of heads that will be read simultaneously.

Another potential structural change involves memory for storing the PES data. The amount of data will differ depending on the number of bits per PES signal, the number of servo wedges per surface, the number of platters/surfaces, the number of cylinders, etc. Different drive controllers have different amounts of memory, and in some cases, existing memory may be sufficient to store the PES data used in accordance with this disclosure. In other cases, additional memory may have to be added. Another possibility is to store the PES data on the drive medium itself. In the latter case, the PES data should be stored on the surface written by the head whose position is controlled. Otherwise, the PES data will be needed to read the PES data, which would not be possible.

Embodiments of this disclosure will now be described with reference to FIGS. 1-5.

Figure 2:
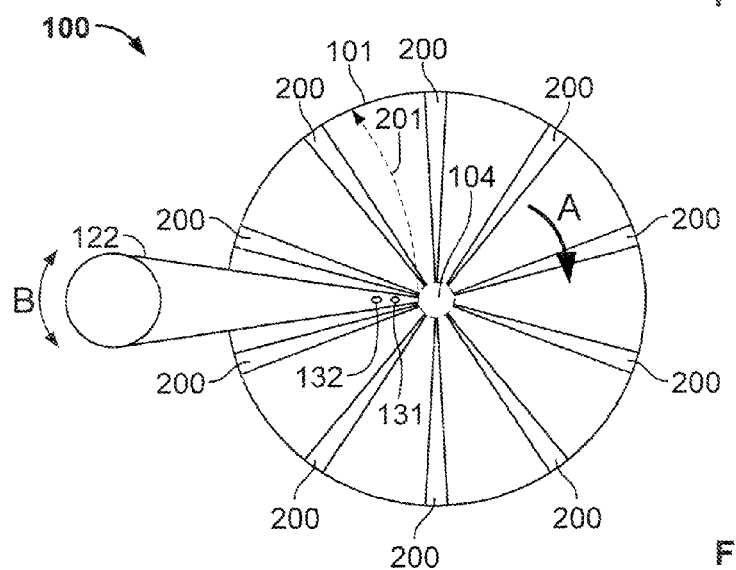
FIG. 2 is a plan view of the disk drive portion of FIG. 1, taken from line 2-2 of FIG. 1.

FIGS. 1 and 2 show an example of a disk drive 100 with which the present disclosure may be used. In this particular example, disk drive 100 has three platters 101, 102, 103, although any number of platters may be included in a disk drive with which the present disclosure may be used. As shown, each platter 101, 102, 103 has, on each of its upper and lower surfaces 111, 112, a coating 110 made from a material, in which data can be stored, e.g., magnetically. The present disclosure also is relevant to a disk drive in which one or more platters includes coating 110 on only one of its surfaces. The platters 101-103 are mounted on a rotatable spindle 104. Motor 105 rotates spindle 104 to rotate platters 101-103 in the direction of arrow A (FIG. 2). Motor 105 is shown connected directly to spindle 104. However, in some cases motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a read head 131 and a write head 132. As noted above, these are normally manufactured on a single substrate. It should be noted that FIGS. 1 and 2 are schematic only and not to scale. Normally, the spindle diameter would be larger by comparison to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the read and write heads 131, 132 along the path indicated by dashed arrow 201. The motion of actuator 121 thus changes both the radial and circumferential positions of read and write heads 131, 132, but the circumferential positional change is relatively unimportant insofar as the platters are rotating. The motion of actuator 121 thus is used to control the radial position of read and write heads 131, 132—i.e., the track or cylinder (see above).

Figure 3:
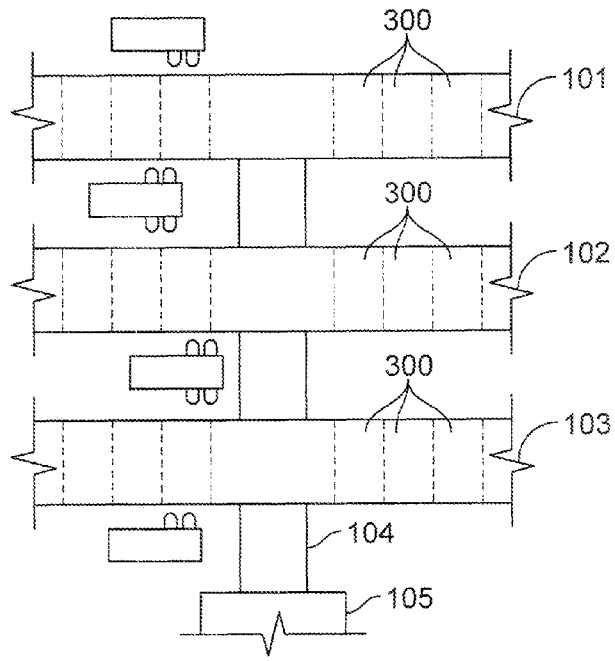
FIG. 3 is a cross-sectional view, taken from line 3-3 of FIG. 1, showing an example of possible head misalignment.

The division of each of surfaces 111, 112 into tracks 300 is indicated in FIG. 3 by dashed vertical lines 301. FIG. 3 also shows, in exaggerated form, how the various read and write heads 131, 132 may be misaligned relative to each other and, therefore, relative to tracks 300, when read and write heads 131, 132 of arm 122 are aligned with one of tracks 300. (In this view, arms 122-125 have been rotated so that their tips are closer to the platter edges.) As noted above, the misalignment relative to tracks 300 may be exacerbated by temperature changes and by vibration (seek—induced and otherwise) of actuator 121 and arms 122-125.

The location on surface 111 of platter 101 (the other surfaces are similar) of the aforementioned wedges is shown in FIG. 2. Each servo wedge 200 includes data identifying it by wedge, or sector, number (to give an angular or circumferential position) and by data representing, at each point along a radius of the platter, the distance from spindle 104.

Figure 4:
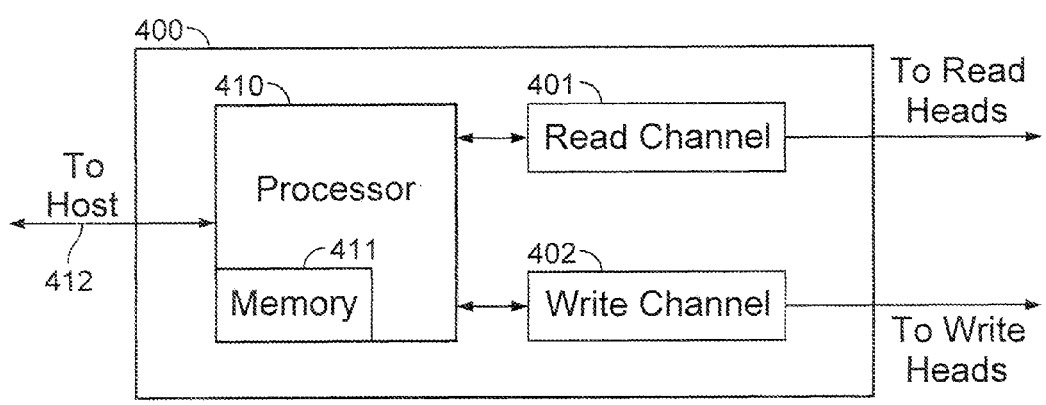
FIG. 4 is a schematic representation of a controller for the drive of FIGS. 1-3.

Each of read and write heads 131, 132 is connected to a read channel 401 and/or a write channel 402 of a hard drive controller 400 (FIG. 4). Hard drive controller 400 also includes a processor 410 and memory 411, as well as a connection 412 to a host processor (not shown). Memory 411 may be used as discussed above to store the PES data that indicates the track position offsets for reading from platters 102, 103 as well as the lower surface 112 of platter 101.

Figure 5:
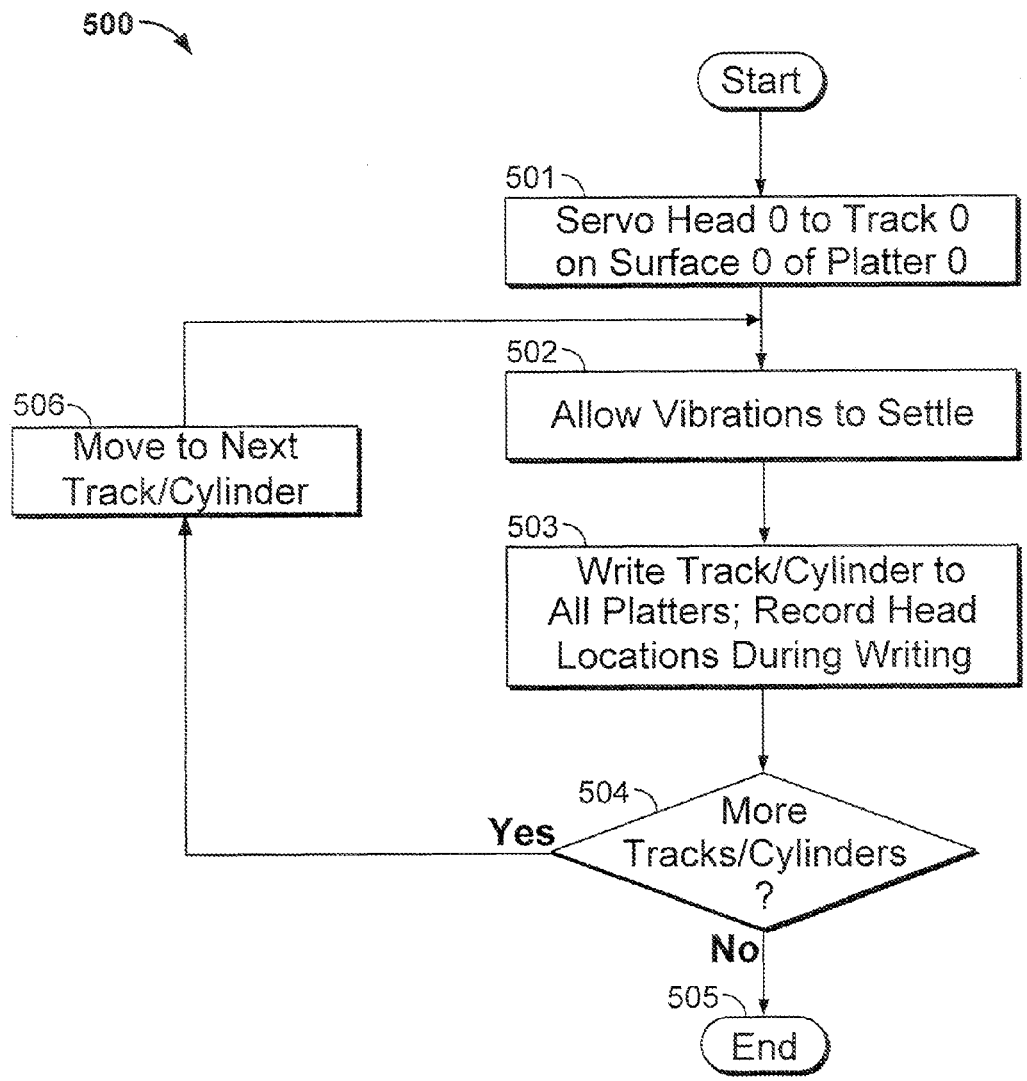
FIG. 5 is a flow diagram of an implementation of a method according to this disclosure.

FIG. 5 is a flow diagram of a method 500 according to this disclosure for a bulk high-speed write operation to all tracks of a disk drive such as drive 100. Method 500 may be carried out by processor 410 of hard drive controller 400.

At 501, a pair of read and write heads 131, 132 on one of arms 122-125 is servoed to a selected track on one of the surfaces 111, 112 a selected one of platters 101-103. For example, read and write heads 131, 132 on arm 122 (collectively, "head 0") are servoed to the first track (track 0) of the upper surface (surface 0) of platter 101 (platter 0). At 502, a predetermined amount of time is allowed to pass to allow settling of vibrations of the head stack that may affect alignment. The predetermined amount of time may be determined empirically, but will usually be longer than the time needed to settle out vibrations for only the head that was servoed.

At 503, after the head stack has settled, a track or cylinder is written by writing to all write heads 132 during one (or possible more than one) revolution of platters 101-103. Simultaneously, all read heads 131 read servo wedges 200, and processor 410 decodes the servo wedge data into track numbers and position error (PES) data, and stores the track numbers and PES data in, e.g., memory 411 or in a designated location on, e.g., platter 101, as discussed above.

At 504, it is determined whether there are more tracks or cylinders to write. If not, method 500 ends at 505. If there are more tracks or cylinders to write, then at 506, the heads 131, 132 on arm 122 are moved one track width in the direction of increasing track/cylinder number (usually radially outward). It can be expected that the relative alignment of the arms 122-125 will remain relatively constant during this seek operation, so that all heads more one track/cylinder width so that the next write operation will not result, on any platter surface, of a substantial encroachment of a new track on a previously recorded track. After this seek operation, method 500 returns to 502 and the method repeats until all tracks/cylinders are written.

The repetition of the loop between 502 and 504 ideally would be carried out diligently, without substantial pauses, so that environmental conditions do not change too much during the process, thereby preventing more than insubstantial changes in the head stack alignment from pass to pass through the loop. Otherwise, there may be "track squeeze" from one pass to the next, in which a track that was written earlier is partially overwritten by a track that is written later. Some degree of track squeeze may occur even where the write head is being controlled, and techniques are known to compensate for track squeeze. But in implementations of the current disclosure where some write heads are not being controlled, if the heads are allowed to change alignment more than insubstantially, track squeeze could occur at the uncontrolled heads to a degree that cannot be compensated for Therefore, while environmental conditions could change even in a short time (e.g., a mobile device containing the disk drive could be jostled or dropped), completing all iterations of the loop expeditiously would minimize the chance the environmental conditions could change more than insubstantially.

As noted, track squeeze or other track misregistration (TMR) events occur even when all write operations are performed by heads under positive control. Drives are designed with a certain track density to accommodate a certain amount of TMR. The amount of track squeeze resulting from implementations of this disclosure may be within the amount of TMR that can be tolerated by a particular drive, or the track density could be decreased where this disclosure is to be implemented, so that more TMR can be tolerated.

After bulk write method 500 is complete, and it becomes necessary to read drive 100, when a host command requests data from a certain track on a certain surface, disk drive controller 400 would check the PES data logs kept during method 500 to determine where to seek to read the requested data. The positions are recorded as measured by the read heads, even though the positions of the write heads a time of writing are the desired positions to which the read heads are to be servoed during reading. Therefore controller 400 may apply an offset either at the time the PES data are recorded, or at the time of reading, then determine what the write head positions were at the time of writing so that the read heads can be servoed to those positions at the time of reading. The offset between the read head and the write head would be a known quantity for any given drive.

The PES data will have been recorded on a wedge-by-wedge basis, and during the read process, controller 400 could adjust the desired position of the head at each wedge based on the stored PES. The difference between the desired position (as adjusted by the stored PES) and the actual position (newly measured PES) would be used as the error signal to drive the positioning servo control loop. Alternatively, particularly where the radial position does not vary significantly around the track, the radial positions of the various wedges of the track could be averaged, and that average position could be used for the entire track read operation.

At some point, a particular track will be rewritten with new data. To avoid encroaching on the neighboring tracks, the particular track would be rewritten at the same positional offset at which it was written during method 500. However, if the offset positions vary from wedge to wedge around the track, then on rewriting, the track could be rewritten at a more constant radius that maintains separation from the neighboring tracks, and the PES logs would be updated accordingly. In selecting the new track position to maintains separation from the neighboring tracks, a simple average of neighboring track positions could be used to select the new position of the current track, or a more sophisticated calculation can be made, such as determining a position halfway between extremes, or a median position, or a trimmed mean, etc.

Thus it is seen that a method and apparatus for writing with more than one head at a time, while controlling only one head, has been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method of writing data using more than one write head to write to more than one storage media platter surface of a storage device at a time, where one actuator in the storage device controls positions of all of the more than one write head, the method comprising:
   controlling the position of one of the write heads to a selected radial track location;
   writing simultaneously to storage media of the storage device at the selected radial track location using a plurality of write heads of the more than one write head; and
   during the writing at the selected radial track location, reading servo data using respective read heads associated with each respective one of the plurality of write heads of the more than one write head and recording radial position of the respective heads for the selected radial track location.

2. The method of claim 1 wherein the recording radial position of the respective heads for the selected radial track location comprises recording an average radial position for the selected radial track location over all servo wedges.

3. The method of claim 1 wherein the recording radial position of the respective heads for the selected radial track location comprises recording a radial position for each servo wedge of the selected radial track location.

4. The method of claim 1 wherein the recording radial position of the respective heads for the selected radial track location comprises recording read head position.

5. The method of claim 1 wherein the recording radial position of the respective heads for the selected radial track location comprises:
   converting read head position to write head position; and
   recording write head position.

6. The method of claim 1 wherein:
   the plurality of write heads of the more than one write head comprises all write heads of the more than one write head; the method further comprising, after the writing at the selected radial track location:
   controlling the position of the one of the write heads to another radial track location adjacent the selected radial track location;
   writing simultaneously to the storage media at the another radial track location using all of the more than one write head; and
   during the writing at the another radial track location, reading servo data using respective read heads associated with each respective one of the more than one write head and recording radial position of the respective heads for the another radial track location.

7. The method of claim 6 further comprising repeating the controlling radial the position of the one of the write heads to another radial track location, the writing simultaneously to the storage media at the another radial track location using all of the more than one write head, and the reading servo data and recording radial position of the respective heads for the another radial track location, until all desired tracks have been written.

8. The method of claim 7 wherein the repeating is performed during substantially constant environmental conditions.

9. The method of claim 8 wherein, after all desired tracks have been written, rewriting a track located at one of the radial track locations at a substantially constant radial position derived from individual positions recorded for each servo wedge at the one of the radial track locations.

10. The method of claim 9 wherein the substantially constant radial position is an average of the individual positions recorded for each servo wedge at the one of the radial track locations.

11. In a disk drive having a plurality of storage media platters, of which more than one storage media platter surface is written at a time using a plurality of write heads only one of which has a controlled position during writing but where positions of heads for other platter surfaces are recorded during writing, a method of reading data, the method comprising:
selecting a track of a platter surface to be read;
determining the recorded head position for the track of the platter surface to be read; and
servoing the read head for the track of the platter surface to be read to the recorded head position.

12. The method of claim 11 wherein:
the recorded head position comprises write head position;
the method further comprising:
converting recorded write head position to read head position prior to the servoing.

13. The method of claim 11 wherein the recorded head position comprises read head position.

14. The method of claim 11 wherein determining the recorded head position comprises looking up the recorded head position.

15. A method of reading and writing data using more than one write head to write more than one storage media platter surface of a storage device at a time, where one actuator in the storage device controls positions of all of the more than one write head and of all read heads, the method comprising:
controlling the position of one of the write heads to a selected radial track location;
writing simultaneously to storage media of the storage device at the selected radial track location using a plurality of write heads of the more than one write head;
during the writing at the selected radial track location, reading servo data using respective read heads associated with each respective one of the plurality of write heads of the more than one write head and recording radial position of each of the respective heads for the selected radial track location;
selecting a track of a platter surface to be read;
determining the recorded head position for the track of the platter surface to be read; and
servoing the read head for the track of the platter surface to be read to the determined recorded head position.

16. The method of claim 15 wherein:
the recorded head position comprises write head position;
the method further comprising:
converting recorded write head position to read head position prior to servoing the read head to the recorded head position.

17. The method of claim 15 wherein the recorded head position comprises read head position.

18. A controller for a disk drive having a plurality of read heads and a plurality of write heads; wherein, when writing to the disk drive:
the disk drive controller servoes the position of one of the write heads to a selected radial track location;
the disk drive controller writes simultaneously to storage media of the storage device at the selected radial track location using a plurality of the write heads; and
during the writing at the selected radial track location, the disk drive controller reads servo data using respective read heads associated with each respective one of the write heads and records radial position of each of the respective heads for the selected radial track location.

19. The disk drive controller of claim 18 wherein, for reading from the disk drive, the disk drive controller:
selects a track of a platter surface to be read;
determines the recorded head position for the track of the platter surface to be read; and
servoes the read head for the track of the platter surface to be read to the determined recorded head position.

20. The disk drive controller of claim 19 wherein:
the recorded head position comprises write head position; and
the disk drive controller converts recorded write head position to read head position prior to servoing the read head to the recorded head position.

21. The disk drive controller of claim 19 wherein the recorded head position comprises read head position.

22. The disk drive controller of claim 19 wherein the disk drive controller determines the recorded head position by looking up the recorded head position.

* * * * *